United States Patent [19]

Rogan

[11] 4,072,809
[45] Feb. 7, 1978

[54] CATALYST AND PROCESS FOR THE POLYMERIZATION OF ALPHA-OLEFINS

[75] Inventor: John B. Rogan, Glen Ellyn, Ill.

[73] Assignee: Standard Oil Company (Indiana), Chicago, Ill.

[21] Appl. No.: 554,599

[22] Filed: Mar. 3, 1975

Related U.S. Application Data

[63] Continuation-in-part of Ser. No. 434,486, Jan. 18, 1974, abandoned.

[51] Int. Cl.$^2$ .......................... C08F 4/66; C08F 10/06
[52] U.S. Cl. ............................. 526/136; 252/429 B; 526/139; 526/141; 526/351
[58] Field of Search .................... 252/429 B; 260/88.2, 260/93.7, 94.9 C; 526/136, 139, 141

[56] References Cited

U.S. PATENT DOCUMENTS

| | | | |
|---|---|---|---|
| 3,240,773 | 3/1966 | Boor | 526/141 |
| 3,502,634 | 3/1970 | Stedefeder et al. | 260/94.9 C |

FOREIGN PATENT DOCUMENTS

| | | |
|---|---|---|
| 4,420,098 | 8/1969 | Japan. |
| 867,139 | 5/1961 | United Kingdom. |

OTHER PUBLICATIONS

Kolesov et al., Chemical Abstracts, vol. 75, (1971), 153658u.
Vesely et al. Journ. Poly. Sci., vol. 55, (1961), pp. 25–32.

*Primary Examiner*—Edward J. Smith
*Attorney, Agent, or Firm*—Reed F. Riley; Arthur G. Gilkes; William T. McClain

[57] ABSTRACT

Novel catalysts and processes are disclosed for producing highly crystalline polypropylene and highly crystalline copolymers of propylene with ethylene or propylene with other alpha-olefins. Such catalysts can reduce the amount of low-molecular-weight and, particularly, amorphous polymers formed without serious effect on the polymerization yield. These novel catalysts and processes involve improving an alkylaluminum compound-titanium chloride catalyst by using in combination small amounts of hydrogen sulfide and a sterically hindered, lower alkyl substituted, cyclic, tertiary amine, a sterically hindered, lower alkyl substituted, cyclic, amine oxide, or a trihydrocarbylphosphite. Such catalyst systems are useful in slurry polymerization, bulk polymerization and techniques in which polymerization is accomplished utilizing monomer substantially in the vapor phase.

22 Claims, No Drawings

CATALYST AND PROCESS FOR THE POLYMERIZATION OF ALPHA-OLEFINS

RELATED APPLICATIONS

This application is a continuation-in-part of copending application Ser. No. 434,486 filed Jan. 18, 1974, now abandoned.

SUMMARY OF THE INVENTION

This invention relates to novel catalysts and processes for the polymerization of propylene, its mixtures with ethylene or mixtures of propylene and other alpha-olefins to produce normally solid, highly crystalline polymers, and more specifically, to a novel catalysts and processes for polymerization of propylene, its mixtures with ethylene or its mixtures with other $C_4$ to $C_8$ alpha-olefins to produce normally solid, highly crystalline, polymeric products wherein coproduced low-molecular-weight and, particularly, amorphous polymers are substantially reduced and polymerization yields are not substantially affected.

In accordance with the instant invention, propylene, its mixtures with ethylene or its mixtures with other $C_4$ to $C_8$ alpha-olefins are polymerized to normally solid, highly crystalline polymers using a slurry, bulk or vapor technique at monomer pressures of about atmospheric pressure or above and moderate polymerization temperatures with a catalyst system comprising: (a) an alkylaluminum compound; (b) a chloride of titanium; (c) hydrogen sulfide; and (d) a sterically hindered, lower alkyl substituted, cyclic, tertiary amine, a sterically hindered, lower alkyl substituted, cyclic, amine oxide or a trihydrocarbylphosphite. The polymeric products produced using the above described catalyst system can contain amounts of low-molecular-weight and amorphous components, as measured by room temperature extraction using n-hexane, as low as about one to two percent to the total polymer yield without seriously sacrificing polymer yield.

BACKGROUND OF THE INVENTION

Polymers of alpha-olefins prepared in the presence of ionic catalyst systems, as for example polypropylene prepared using a catalyst comprised of diethylaluminum chloride and a titanium trichloride, contain greater or lesser amounts of low-molecular-weight and, particularly, amorphous components which, when taken alone, are alkane soluble materials. The presence of these alkane-soluble materials in the polymers leads to difficulties during the fabrication of products therefrom and to inferior physical properties in the finished items, and hence are almost always removed in commercial processes for the production of polypropylene. Production of these components leads to an economic disability for the polymerization process as they have little usefulness and extra process steps are required to remove them from the commercial product.

In the past a number of materials and combinations thereof have been reported in the patent literature as useful additives to transition metal compound — alkylaluminum compound catalysts to reduce the alkane-soluble fraction produced during the polymerization process. Among these additives are amines, amine oxides, ethers, organophosphites, and mixtures of organotin sulfides and amines, amine oxides or organophosphites. The mixtures containing organotin sulfides have been described as showing a greater effect on solubles reduction than either component of the mixture alone. However, such mixtures have some disadvantages which include the high cost of organotin sulfides.

In addition, it has been disclosed in U.S. Pat. No. 3,159,614 that reacting the transition metal component of these types of catalysts with hydrogen sulfide or selenide aids in producing more highly crystalline polymer when used to polymerize olefins.

Since it is generally true that slowing an alpha-olefin polymerization down produces more of the desired crystalline polymer, and that additives when their concentrations become high enough slow the polymerization, the object of the work leading to the invention taught herein is to obtain the maximum solubles reduction with the smallest effect upon rate.

Now it has been found that by using hydrogen sulfide and a sterically hindered, lower alkyl substituted, cyclic, tertiary amine, a sterically hindered, lower alkyl substituted, cyclic, amine oxide or a trihydrocarbylphosphite, as additives to titanium trichloride-alkylaluminum compound catalysts, systems are formed which, when used for propylene polymerization, can result in a substantial reduction of the alkane solubles while not seriously affecting the total yield of polymer. The systems taught herein (combinations of additives) can be better in solubles reduction than either additive of the combination alone. In addition, the systems taught herein can result in an improvement in solventless polymerization processes wherein the olefin is polymerized directly from the vapor or liquid phase. The catalyst systems disclosed herein may also be used for alpha-olefin polymerizations wherein supported or other types of high activity transition metal compound components are employed.

STATEMENT OF THE INVENTION

As shown in Table I below the n-hexane soluble fraction can be reduced in a polypropylene slurry polymerization when a diethylaluminum chloride-titanium trichloride catalyst is admixed with hydrogen sulfide.

TABLE I

| Comparison of Crystalline Polypropylene Yield and Solubles for Different Amounts of Hydrogen Sulfide Added | | |
|---|---|---|
| Mol Ratio $Et_2AlCl/TiCl_3/H_2S$* | Crystalline Yield (Grams) | n-Hexane Solubles (Percent) |
| 1.50/1.0/0 | 25.1 | 4.6 |
|  | 26.0 | 3.8 |
| 2.50/1.0/0 | 24.2 | 4.9 |
|  | 25.7 | 3.8 |
| 1.0/1.0/0.010 | 24.6 | 2.8 |
| 1.0/1.0/0.030 | 23.6 | 2.7 |
| 3.0/1.0/0.010 | 29.7** | 3.3 |
| 3.0/1.0/0.030 | 25.6 3.4 | |

*Et represents the ethyl radical
**This value is unreasonably large and is probably the result of experimental error.

The results in Table I indicate that utilizing a small portion of hydrogen sulfide with the catalyst can result in lower solubles without serious effect on the yield in the case of the higher $Et_2AlCl/TiCl_3$ ratio. However, solubles reduction does not proceed very far with increasing hydrogen sulfide concentration before the rate drops off markedly.

The data set forth in Tables II and III below shows an additional lowering of solubles can occur in a slurry type, propylene polymerization when an additive such as a sterically hindered, lower alkyl substituted cyclic, tertiary amine or a trihydrocarbylphosphite is also utilized with the catalyst. Table III shows in addition that increased amounts of amine reduce the yield, a common feature of most if not all additives for the improvement of stereoregularity in alpha-olefin polymers.

TABLE II

Comparison of Crystalline Polypropylene Yield and Solubles for Different Amounts of Organo Phosphite Used

| Mol Ratio $Et_2AlCl/TiCl_3/H_2S/TBP$* | Crystalline Yield (Grams) | n-Hexane Solubles (Percent) |
|---|---|---|
| 2.5/1.0/0/0 | 25.0 | 4.4 |
| 3.0/1.0/0/0 | 25.6 | 3.4 |
| 3.0/1.0/0.03/0.05 | 26.4 | 2.6 |
| 3.0/1.0/0.03/0.20 | 25.8 | 1.5 |
| 3.0/1.0/0.03/0.45 | 25.6 | 2.0 |

*TBP is tributylphosphite

TABLE III

Comparison of Crystalline Polypropylene Yield and Solubles for Different Amounts of Amine Used

| Mol Ratio $Et_2AlCl/TiCl_3/H_2S/Coll$* | Crystalline Yield (Grams) | n-Hexane Solubles (Percent) |
|---|---|---|
| 2.5/1.0/0/0 | 25.0 | 4.4 |
| 3.0/1.0/0.01/0 | 29.7 | 3.3 |
| 2.5/1.0/0.01/0.01 | 24.7 | 2.2 |
| 2.5/1.0/0.01/0.020 | 22.3 | 2.3 |

*Coll is 2,4,6-collidine

The alkylaluminum compounds preferred in the herein described invention are alkylaluminum derivatives wherein the alkyl radical contains one to about six carbon atoms and, more specifically, are trialkylaluminums, mixtures thereof with an alkylaluminum dichloride or dibromide or a dialkylaluminum chloride or bromide, or dialkylaluminum chlorides or bromides. More preferably, this first material is a trialkylaluminum, mixtures thereof with either a dialkylaluminum chloride or an alkylaluminum dichloride, or a dialkylaluminum chloride. Most preferably, a dialkylaluminum chloride is used. The amount of alkylaluminum compound used is based upon the reactor size, the amount of titanium component used and the amount of olefin to be polymerized as is well known to one skilled in the art.

The titanium compounds preferred herein are titanium chlorides and, more preferably, a titanium trichloride or a composition based essentially thereon such as aluminum activated titanium trichloride and titanium trichlorides activated in other manners. The amount of this second material used is based upon the amount and composition of the particular polymer to be made and is well known to one skilled in the art.

The amount of hydrogen sulfide used is an effective amount, preferably less than a small fraction of the total amount of alkylaluminum compound employed, but up to as much as about ten mol percent of the alkylaluminum compound. More preferably, an effective amount of hydrogen sulfide up to about five mol percent of the alkylaluminum compound is employed. Most preferably, an effective amount of hydrogen sulfide up to about three mol percent of the amount of alkylaluminum compound used is employed. Too much hydrogen sulfide should not be used as it can kill the catalyst as can be understood by one skilled in the art.

The second additive is a sterically hindered, lower alkyl substituted, cyclic, tertiary amine such as 2,6-lutidine, 2,4,6-collidine, 2,4-lutidine and the like, a sterically hindered, lower alkyl substituted, cyclic, amine oxide such as 2,6-lutidine-N-oxide, or a trihydrocarbylphosphite such as triphenylphosphite, tribenzylphosphite, tributylphosphite and the like. More preferably, sterically hindered, di- or tri-lower alkyl substituted, cyclic, tertiary amines, amine oxides, or a trihydrocarbylphosphite may be used. Most preferably, a tri-lower alkyl substituted, cyclic, tertiary amine, such as 2,4,6-collidine, or a lower alkyl, trialkylphosphite is used. Lower alkyl means here alkyl radicals of from one to about six carbon atoms. It should be understood that mixtures of amines, amine oxides or phosphites may also be employed, e.g., a mixture of collidines may be employed.

The second additive is employed in at least an effective amount, and too much can kill the polymerization as can be understood by one skilled in the art. Preferably, the $H_2S$-second additive mol ratio is in the range from about four to one to about one to thirty and, more preferably, the $H_2S$-second additive mol ratio is in the range about one to one to about one to ten and, most preferably, the mol ratio employed is about one to one to two.

A preferred mode of addition is to admix hydrogen sulfide and the alkylaluminum compound allowing time for reaction to occur, a minute or more, and then admix the second additive, e.g., collidine, and finally the titanium compound. However, any manner of making up the catalyst system of alkylaluminum compound, a titanium chloride, hydrogen sulfide and amine, amine oxide or organophosphite may be used.

As is obvious to one skilled in the art, precautions should be taken to avoid oxygen and moisture contamination of the catalyst during its preparation and its transfer. Catalyst preparation can be carried out under an inert atmosphere using such gases as argon, nitrogen, helium etc. Normally, during use no precautions need be taken as a positive pressure of monomer gas exists within the reactor.

The temperature at which the catalyst may be used is not critical. However, at temperatures below about 0° C. the rate of polymerization slows down and reactor residence times becomes unreasonably long whereas, at temperatures above about 120° C., polymerization rates become too high and an increase in solubles production is found. Preferably, the temperature range in which the catalyst can be used is about 2° C. to about 95° C. Most preferably, the temperature range is about 50° C. to about 80° C.

The process of the invention can be carried out at a monomer pressure of about atmospheric or above. Pressures of about 20 p.s.i.g. to about 600 p.s.i.g. or higher are preferred depending upon which polymerization technique is used.

The organic liquid employed as the polymerization medium in the slurry technique can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as toluene or xylene, or halogenated aromatic compound such as chlorobenzene, chloronaphthalene or ortho-dichlorobenzene. The nature of the reaction medium is subject to considerable variation, although the material employed should be liquid under the conditions of reaction and relatively inert. The hydrocarbon liquids are desirably employed. Other solvents which can be used include ethylbenzene, isopropylbenzene, ethyltoluene, n-propylbenzene, diethylbenzenes, mono- and dialkylnaphthalenes, n-pentane, n-octane, isooctane and methylcyclohexane. The preparative media employed in practicing this invention can be advantageously purified prior to use in the polymerization reaction by contacting the material, for example, in distillation procedure or otherwise, with an alkylaluminum compound to remove undesirable trace impurities. Also, prior to polymerization the catalyst system can be contacted advantageously with a polymerizable alpha-olefin such as propylene.

The polymerization time is not critical and will usually be of the order of from thirty minutes to several hours in batch processes. Contact times of from one to four hours are commonly employed in autoclave-type reactions. When continuous slurry process is employed, the contact times in the polymerization zone can also be regulated as desired, and it is not necessary to employ reaction or contact times much beyond one-half to several hours since a cyclic system can be employed by separation of the polymer and return of the polymerization medium and excess monomer to the charging zone wherein the catalyst can be replenished and additional monomer introduced.

The invention is of particular importance in the preparation of highly crystalline polypropylene, although it can be used for polymerizing mixtures of propylene and, preferably, up to about ten or so mol percent of ethylene or another alpha-olefin of up to about eight carbon atoms to form highly crystalline copolymers. Such copolymers include pure-block and terminal block types of copolymers of propylene and ethylene and propylene and other alpha-olefins of up to about eight carbon atoms.

The process and catalyst combination of this invention are normally used with an additive to control molecular weight such as dialkylzinc compounds or hydrogen, preferably hydrogen. Solid polymers having molecular weights greater than about 50,000 and less than about 5,000,000 result thereby. The amount of hydrogen to be used depends upon the melt index and molecular weight distribution to be obtained and the condition of its use are well known to those skilled in the art.

While the invention herein is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

The polymerizations described in Examples I through IV were carried out in pressure bottles at 70° C for 2 hours using 40 p.s.i.g. of propylene and 0.20 grams of aluminum activated titanium trichloride (AATiCl$_3$) added as a 25 percent slurry in mineral oil.

The catalyst was made up at room temperature by admixing the requisite amount of hydrogen sulfide and the alkylaluminum compound dissolved in hexane, waiting up to 1 hour and then admixing the results with the second additive, and then admixing the titanium trichloride, and hexane diluent.

After polymerization the contents of the pressure bottle were killed with methanol and the solid filtered off, dried and weighed to give the Crystalline Yield. The supernatant liquid was evaporated to dryness and the residue weight, multiplied by 100 and divided by the Crystalline Yield plus the residue weight, was calculated to give the percent of n-Hexane Solubles.

The Crystalline Yield and n-Hexane Solubles have been corrected for variation in different batches of catalyst components, propylene etc. by running a standard polymerization each time an experimental run was made and correcting the experimental run for any deviation of the standard's Crystalline Yield or n-Hexane Solubles. In Examples I through III each Crystalline Yield and n-Hexane Solubles value is the average of two polymerization runs.

EXAMPLE I

| Mol Ratio Et$_2$AlCl/TiCl$_3$/H$_2$S | Crystalline Yield (grams) | n-Hexane Solubles (Percent) |
|---|---|---|
| 3.0/1.0/0.010 | 29.7* | 3.3 |
| 3.0/1.0/0.030 | 25.6 | 3.4 |
| 1.0/1.0/0.010 | 24.6 | 2.8 |
| 1.0/1.0/0.030 | 23.6 | 2.7 |
| 1.5/1.0/0.0 | 26.6 | 4.7 |
| 2.5/1.0/0.0 | 25.0 | 4.3 |

*This value is unreasonably large and is probably the result of experimental error.

EXAMPLE II

| Mol Ratio Et$_2$AlCl/H$_2$S/TBP/TiCl$_3$ | Crystalline Yield (grams) | n-Hexane Solubles (Percent) |
|---|---|---|
| 3.00/0.030/0.45/1.00 | 25.6 | 2.0 |
| 0.30 | 27.3 | 1.8 |
| 0.20 | 25.8 | 1.5 |
| 0.10 | 27.0 | 1.4 |
| 0.05 | 26.4 | 2.6 |
| 0.010/0.45/1.00 | 23.6 | 1.7 |
| 0.30 | 28.5 | 1.5 |
| 0.20 | 25.6 | 1.9 |
| 0.10 | 28.5 | 2.0 |
| 0.05 | 27.1 | 2.4 |
| 2.00/0.030/0.45/1.00 | 24.5 | 2.3 |
| 0.30 | 28.0 | 1.6 |
| 0.20 | 26.0 | 1.8 |
| 0.10 | 25.7 | 1.7 |
| 0.05 | 24.1 | 2.0 |
| 0.010/0.45/1.00 | 24.2 | 2.5 |
| 0.30 | 24.1 | 1.9 |
| 0.20 | 24.3 | 1.9 |
| 0.10 | 25.9 | 1.6 |
| 0.05 | 24.9 | 1.9 |

EXAMPLE III

| Mol Ratio Et$_2$AlCl/H$_2$S/CoII/TiCl$_3$ | Crystalline Yield (grams) | n-Hexane Solubles (Percent) |
|---|---|---|
| 2.50/0.030/0.060/1.00 | 19.9 | 2.1 |
| 0.030 | 21.3 | 2.2 |
| 0.020/0.040/1.00 | 20.9 | 2.0 |
| 0.020 | 22.4 | 2.1 |
| 0.010/0.020/1.00 | 22.3 | 2.3 |
| 0.010 | 24.7 | 2.2 |
| 1.50/0.030/0.060/1.00 | 18.8 | 2.0 |
| 0.030 | 19.9 | 2.1 |
| 0.020/0.040/1.00 | 18.6 | 1.8 |
| 0.020 | 19.8 | 1.9 |
| 0.010/0.020/1.00 | 19.6 | 2.1 |
| 0.010 | 20.7 | 2.2 |
| 1.00/0.030/0.060/1.00 | 16.4 | 1.8 |
| 0.030 | 18.7 | 2.0 |
| 0.020/0.040/1.00 | 18.2 | 2.0 |
| 0.020 | 17.4 | 2.3 |
| 0.010/0.020/1.00 | 21.0 | 2.1 |
| 0.010 | 20.9 | 2.4 |

EXAMPLE IV

In this Example the order of admixing the components of the catalyst system was varied to demonstrated the relative, unimportance of various modes of addition. In each of the polymerization runs shown below the mol ratio, $Et_2AlCl/H_2S/Coll/TiCl_3$, is 2.00/0.01/0.02/1.00.

| Order of Addition | Crystalline Yield (grams)* | n-Hexane* Solubles (Percent) |
|---|---|---|
| $Et_2AlCl/H_2S/Coll/TiCl_3$ | 22.24 | 2.6 |
|  | 21.44 | 2.8 |
| $Et_2AlCl/TiCl_3/Coll/H_2S$ | 20.14 | 2.5 |
|  | 19.14 | 2.4 |
| $Et_2AlCl/Coll/H_2S/TiCl_3$ | 20.23 | 2.5 |
|  | 20.03 | 2.4 |

*Duplicate runs are shown for each order of addition.

EXAMPLE V

Propylene was polymerized by a bulk phase polymerization in a two liter reactor using fifty milligrams of a material essentially titanium trichloride in each run. In the four hour runs, 1,300 milliliters of liquid propylene was initially added followed by an additional 400 to 600 milliliters as the run progressed. In the two hour runs, 1,300 milliliters of liquid propylene was added at the start of the run but no addition propylene was added.

| Mol Ratio $Et_2AlCl/TiCl_3/H_2S/Coll$ | Polymerization Time (hours) | Crystalline Activity (grams/gram/hour) | n-Hexane Extractibles (Percent) |
|---|---|---|---|
| 3/1/0.03/0.06* | 2 | 3,596 | 2.7 |
|  | 2 | 3,426 | 2.4 |
|  | 4 | 2,526 | 3.2 |
| * | 4 | 2,686 | 2.8 |
| 2.7/1/0.027/0.054 | 2 | 3,745 | 3.3 |
|  | 4 | 2,930 | 3.3 |
| 2.4/1/0.024/0.048 | 2 | 3,283 | 3.4 |
|  | 4 | 2,731 | 3.9 |
| 2.0/1/0.02/0.04 | 2 | 3,436 | 4.8 |
|  | 4 | 2,763 | 5.4 |

*These systems were made up by admixing the $Et_2AlCl$ and hydrogen sulfide in mineral oil, stirring at ambient temperature for forty-five minutes, adding the titanium containing material and finally the collidine. All the remaining systems were made up by adding the titanium contaning material to the mineral oil followed by the $Et_2AlCl$, then the hydrogen sulfide and finally the collidine.

Crystalline Activity instead of Crystalline Yield is tabulated for this Example and is the Crystalline Yield divided by the polymerization run duration in hours. Also, n-Hexane Extractibles is tabulated instead of n-Hexane Solubles. The extractibles are measured by pressing a film from a certain weight of the polymer powder, powdering the film to below a certain mesh size and extracting a standard weight of the powder with n-hexane in a Soxhlet extractor for 6 hours. Thus, for a given product n-Hexane Extractibles is always a larger figure number than n-Hexane Solubles.

EXAMPLE VI

Propylene was polymerized in a vapor phase polymerization reactor at 160° F and 300 p.s.i.g. total pressure using a $Et_2AlCl/TiCl_3/H_2S/Coll$ mol ratio of 3.00/1.00/0.030/0.060. Hydrogen was utilized in each of the polymerization runs below and a 3 hour reactor residence time was employed.

| Run No. | Melt Flow (grams/ten minutes) | Crystalline Yield** (grams/gram TiCl_3) | n-Hexane Extractibles* (Percent) |
|---|---|---|---|
| 157-25 | 3.3 | 7,000 | 3.5 |
| 160-97 | 2.9 | 8,000 | 4.2 |
| 168-76 | 5.2 | 7,200 | 4.4 |

*Volatile content has been subtracted from these figures.
**Note that Crystalline Yield is defined differently in this Example.

What is claimed is:

1. A polymerization catalyst composition which comprises:
   (a) an alkylaluminum compound selected from the group consisting of a trialkyl aluminum, a mixture of a trialkyl aluminum and an alkylaluminum dichloride or dibromide, a mixture of a trialkyl aluminum and a dialkylaluminum chloride or bromide and a dialkylaluminum chloride or bromide;
   (b) an effective amount up to about 10 mol percent of hydrogen sulfide based upon the amount of alkylaluminum compound present;
   (c) an activated titanium trichloride; and
   (d) an effective amount of an additive which is selected from the group consisting of trihydrocarbylphosphites, sterically hindered, lower alkyl substituted, cyclic, tertiary amines and sterically hindered, lower alkyl substituted, cyclic, amine oxides;

said amounts effective to result in a substantial reduction of alkane solubles while not seriously affecting the total yield of polymer.

2. The composition of claim 1 wherein said alkylaluminum compound is a dialkylaluminum chloride and said additive is a trihydrocarbylphosphite.

3. The composition of claim 1 wherein said alkylaluminum compound is a dialkylaluminum chloride and said additive is a sterically hindered, lower alkyl substituted, cyclic, tertiary amine.

4. The composition of claim 1 wherein said alkylaluminum compound is a dialkylaluminum chloride and said second is a sterically hindered, lower alkyl substituted, cyclic, amine oxide.

5. The composition of claim 2 wherein said additive is a lower alkyl, trialkylphosphite.

6. The composition of claim 3 wherein said additive is a sterically hindered, di- or tri-lower alkyl substituted, cyclic, tertiary amine.

7. The composition of claim 4 wherein said additive is 2,6-lutidine-N-oxide.

8. The composition of claim 5 wherein said additive is tributylphosphite.

9. The composition of claim 6 wherein said additive is 2,4,6-collidine.

10. A process for the polymerization of propylene or a mixture of propylene and ethylene or propylene and another $C_4$ to $C_8$ alpha-olefin to form a highly crystalline polymeric substance, said process involving contacting under polymerizing conditions said propylene or said mixture with a catalyst comprising:
   (a) an alkylaluminum compound selected from the group consisting of a trialkylaluminum, a mixture of a trialkyl aluminum and an alkylaluminum dichloride or dibromide, a mixture of a trialkyl aluminum and a dialkylaluminum chloride or bromide and a dialkylaluminum chloride or bromide;

(b) an effective amount up to about 10 mol percent hydrogen sulfide based upon the amount of alkylaluminum compound present;

(c) an activated titanium trichloride; and (d) an effective amount of an additive which is selected from the group consisting of trihydrocarbylphosphites, sterically hindered, lower alkyl substituted, cyclic, tertiary amines and sterically hindered, lower alkyl substituted, cyclic, amine oxides;

said amounts effective to result in a substantial reduction of alkane solubles while not seriously affecting the total yield of said polymeric substance.

11. The process of claim 10 wherein said alkylaluminum compound is a dialkylaluminum chloride and said additive is a trihydrocarbylphosphite.

12. The process of claim 10 wherein said alkylaluminum compound is a dialkylaluminum chloride and said additive is a sterically hindered, lower alkyl substituted, cyclic, tertiary amine.

13. The process of claim 10 wherein said alkylaluminum compound is a dialkylaluminum chloride and said additive is a sterically hindered, lower alkyl substituted, cyclic, amine oxide.

14. The process of claim 11 wherein said additive is a lower alkyl, trialkylphosphite.

15. The process of claim 12 wherein said additive is a sterically hindered, di- or tri-lower alkyl substituted, cyclic, tertiary amine.

16. The process of claim 13 wherein said additive is 2,6-lutidine-N-oxide.

17. The process of claim 14 wherein said additive is tributylphosphite.

18. The process of claim 15 wherein said additive is 2,4,6-collidine.

19. A process for the polymerization of propylene or a mixture of propylene and ethylene or propylene and another $C_4$ to $C_8$ alpha-olefin to form a highly crystalline polymeric substance, said process involving contacting under polymerizing conditions said propylene or said mixture with a catalyst comprising:

(a) an alkylaluminum compound selected from the group consisting of a trialkyl aluminum, a mixture of a trialkyl aluminum and an alkylaluminum dichloride or dibromide, a mixture of a trialkyl aluminum and a dialkylaluminum chloride or bromide and a dialkylaluminum chloride or bromide, said alkylaluminum compound having been treated with an effective amount, up to about 10 mol percent based on the amount of said alkylaluminum compound, of hydrogen sulfide;

(b) an activated titanium trichloride; and (c) an effective amount of an additive which is selected from the group consisting of trihydrocarbylphosphites, sterically hindered, lower alkyl substituted, cyclic, tertiary amines, and sterically hindered, lower alkyl substituted, cyclic, amine oxides;

said amounts effective to result in a substantial reduction of alkane solubles while not seriously affecting the total yield of said polymeric substance.

20. The process of claim 19 wherein said alkylaluminum compound is a dialkylaluminum chloride and said additive is 2,6-lutidine-N-oxide.

21. The process of claim 19 wherein said alkyaluminum compound is a dialkylaluminum chloride and said additive is a sterically hindered, di- or tri-lower alkyl substituted, cyclic, tertiary amine.

22. The process of claim 21 wherein said additive is 2,4,6-collidine.

* * * * *

UNITED STATES PATENT OFFICE
CERTIFICATE OF CORRECTION

Patent No. 4,072,809     Dated February 7, 1978

Inventor(s) John B. Rogan

It is certified that error appears in the above-identified patent and that said Letters Patent are hereby corrected as shown below:

Col. 2, line 53, Table I, second column, "3.4" should appear under last column, line 53, -- n-Hexane --.
                         Solubles
                         (Percent)

Signed and Sealed this

Twenty-fourth Day of October 1978

[SEAL]

Attest:

RUTH C. MASON
*Attesting Officer*

DONALD W. BANNER
*Commissioner of Patents and Trademarks*